Jan. 17, 1961     T. M. LOWE     2,968,285
VALVE

Filed Aug. 30, 1956     4 Sheets-Sheet 1

INVENTOR.
THEODORE M. LOWE
BY
James L. O'Brien
ATTORNEY

INVENTOR.
THEODORE M. LOWE
BY
ATTORNEY

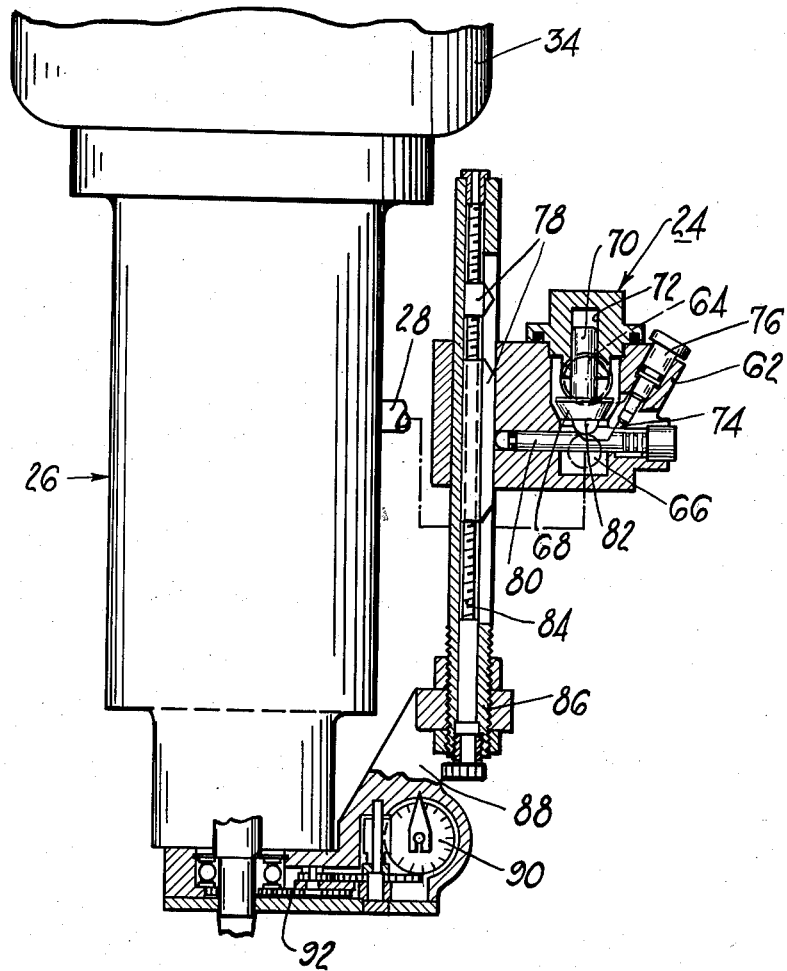

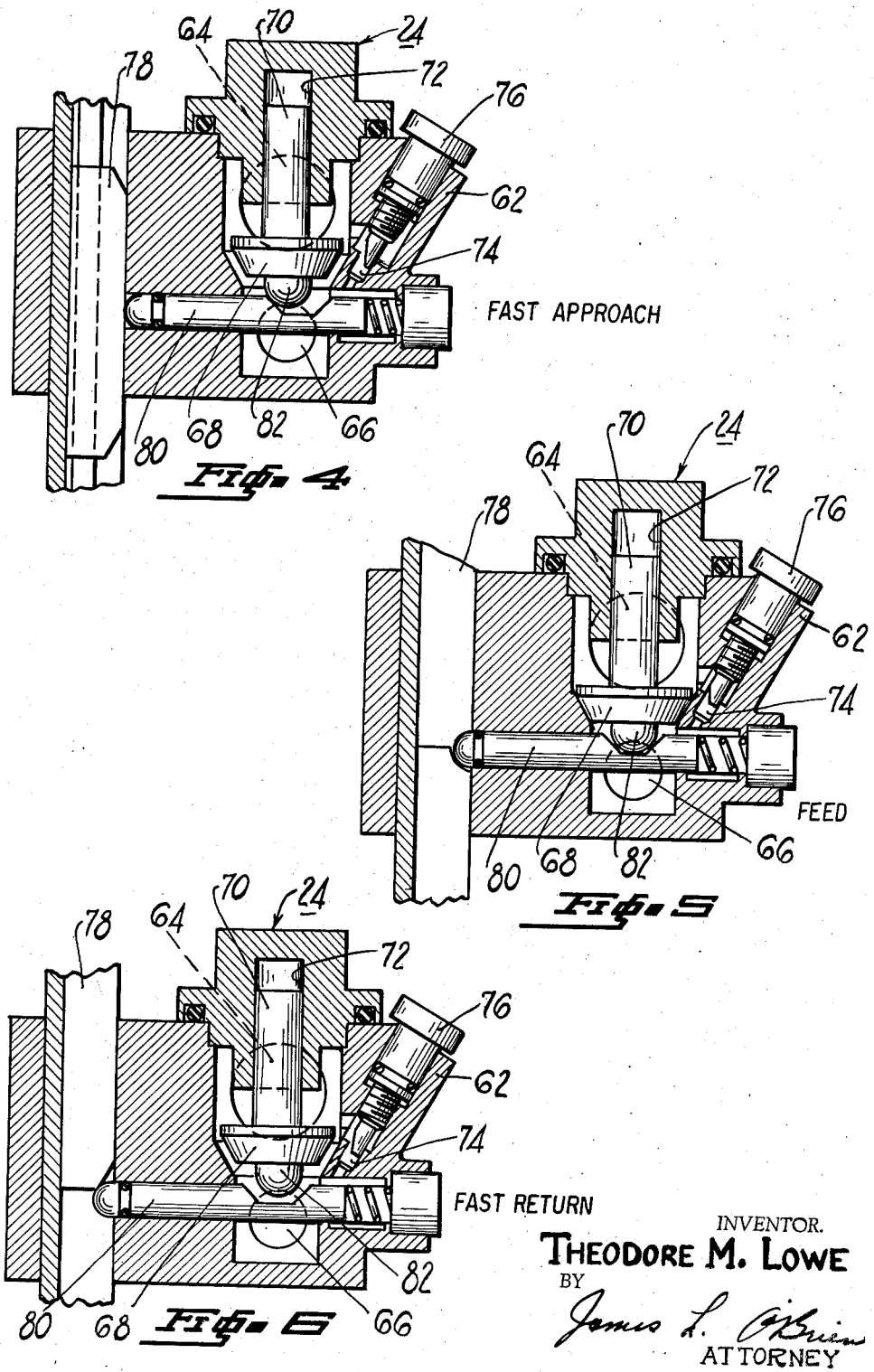

United States Patent Office 2,968,285
Patented Jan. 17, 1961

2,968,285
VALVE
Theodore M. Lowe, Detroit, Mich., assignor to The Bendix Corporation, a corporation of Delaware
Filed Aug. 30, 1956, Ser. No. 607,239
3 Claims. (Cl. 121—45)

The present invention relates to a control means for machine tools.

It is an object of the present invention to provide a simple, relatively inexpensive control for a machine tool which is accurate and reliable in operation.

Other objects and advantages of the present invention will become apparent during the course of the following description, reference being had therein to the accompanying drawings, in which:

Figure 3 is a vertical sectional view through the control valve and revolution indicator of my invention; and Figures 4, 5 and 6 are enlarged views of the valve shown in Figure 3 showing the valve in operating positions.

Figure 1:
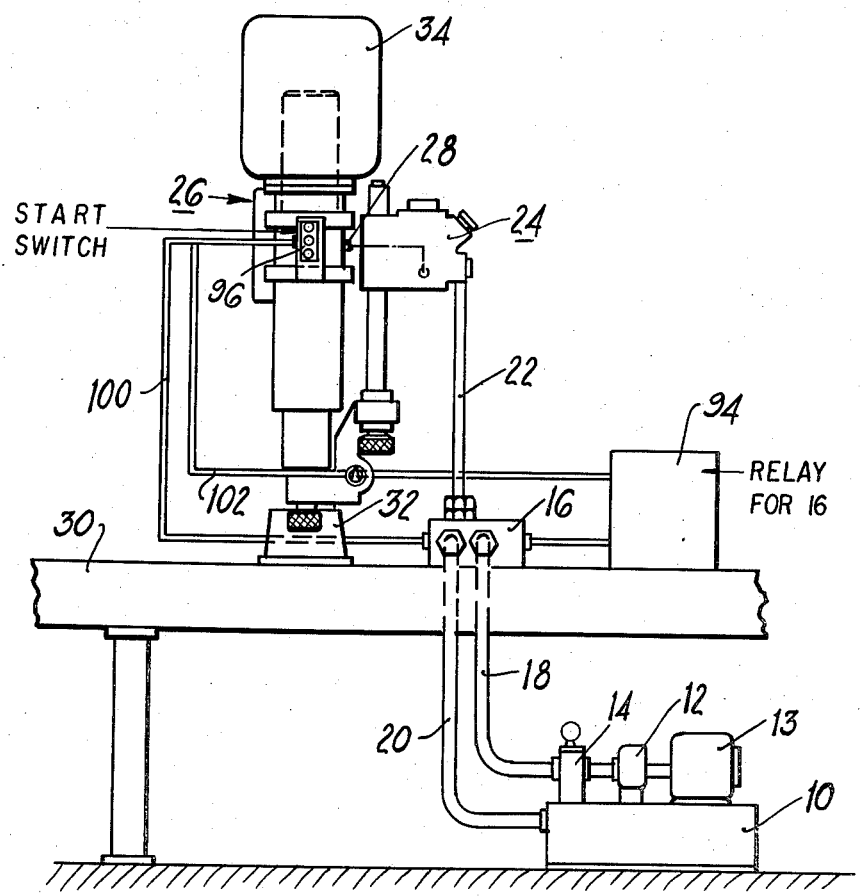
Figure 1 is a view of a control embodying the present invention as applied to a drill press.
Figure 2:
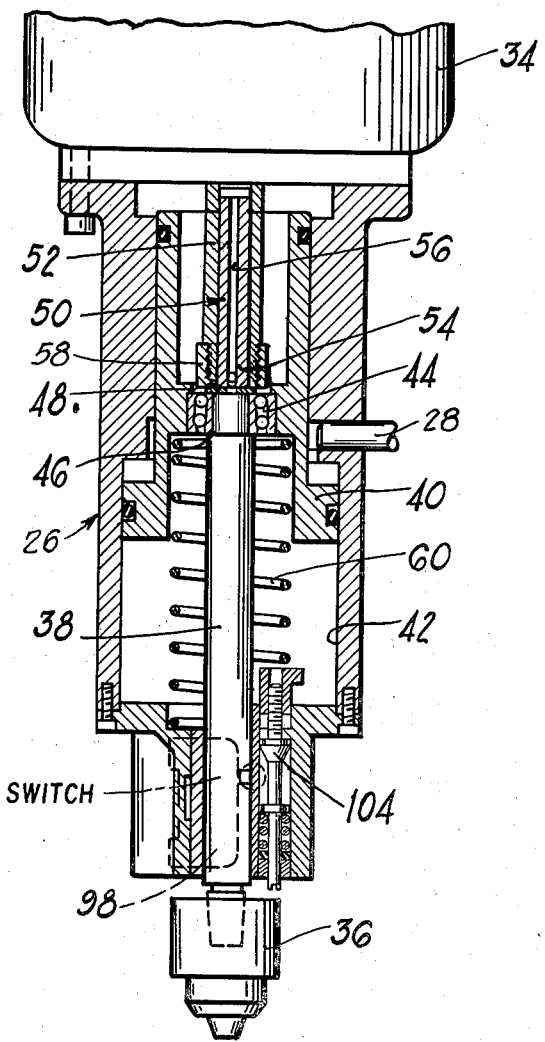
Figure 2 is a vertical sectional view through a portion of the drill.

Referring now to the drawings, numeral 10 designates a fluid reservoir, 12 a pump driven by a motor 13 and having an inlet connected to said reservoir and an outlet connected to a pressure regulator 14 which in turn is connected to a selector valve 16 by means of a conduit 18. Reservoir or fluid source 10 is connected directly to selector valve by means of a conduit 20.

Selector valve 16 is connected by conduit 22 to a control valve 24 which is connected to machine tool or drill 26 by means of conduit 28.

Drill 26 is mounted on a table 30 by an appropriate stand 32 and is provided with a motor 34, the speed of which may be accurately controlled by appropriate means (not shown). Drill 26 is provided with a tool holder 36 which is connected by a rod or spindle 38 to a piston 40 reciprocably disposed in a cylinder 42. Rod 38 is rotatably mounted in bearing 44, secured to piston 40, and is restrained from axial movement with respect thereto by a shoulder 46 and a snap ring 48.

An extension 50 of rod or spindle 38 is reciprocably disposed in hollow drive shaft 52 of motor 34, and is adapted to be driven thereby through a dowel 54 secured to shaft 52 which rides in a keyway 56 formed in extension 50. A nut 58 is threadedly received on shaft 52 to form an adjustable abutment for piston 40 whereby the retraction of tool holder 36 may be adjustably limited.

Piston 40 is adapted to be moved downwardly in a tool engaging direction under the influence of fluid pressure supplied to cylinder 42 through conduit 28 and is urged in an opposite or tool retraction direction by spring 60 which is arranged to react against an end wall of cylinder 42 and the under surface of piston 40.

Control valve 24 is provided with a housing 62 having an inlet 64 adapted for connection with conduit 22 and an outlet 66 adapted for connection with conduit 28. A main valve 68 is provided with a stem 70 for reciprocation in a bore 72 formed in housing 62. Valve 68 is movable in response to a pressure differential between the fluid pressure in inlet 64 and the fluid pressure in outlet 6. A constantly open by-pass 74 is connected to inlet 64 and outlet 66 around valve 68. By-pass 74 is provided with an adjustable metering valve 76 to regulate the flow therethrough. Valve 68 is adapted to be opened by a cam 78 acting through push rod 80 and a button 82 formed on the valve. Cam 78 is threaded on an adjustment member 84 which is mounted in a guide member 86. Guide member 86 is secured to a bracket 88 which is mounted on rod or spindle 38 for axial movement therewith.

Cam 78 may consist of a single unit or may comprise a plurality of spaced units, two of which are shown in Figure 3. The cam units 78 are constructed and arranged to permit simultaneous adjustment of all units or to permit independent adjustment of individual units.

A revolution indicator 90 which is driven as a function of spindle speed through an appropriate gear train 92 is conveniently mounted on bracket 88.

Selector valve 16 is actuated by a relay 94 which is controlled by a push button switch 96 and micro-type switch 98 which are connected by appropriate leads 100 and 102 respectively to relay 94. Switch 98 is located in cylinder 42 and is adapted to be actuated by a movable cam 104 which is reciprocably mounted to project within cylinder 42 and to be engaged by piston 40 when the piston has been moved to a predetermined position. Movement of the cam 104 downwardly actuates switch 98 to energize relay 94 to move selector valve 16 to a position to connect low pressure conduit 20 with conduit 22 and at the same time disconnect high pressure conduit 18 from conduit 22. As high pressure fluid is cut off to cylinder 42 spring 60 becomes effective to move piston 40 upwardly whereby fluid is forced from cylinder 42 through conduit 28 to outlet 66 of valve 24 whereupon valve 68 is moved upwardly to permit fluid to flow through port 64, conduits 22 and 20 to the reservoir 10.

A cycle is commenced by actuating switch 96 which energizes relay 94 to move selector valve 16 to a position to connect high pressure conduit 18 with conduit 22. In the starting position such as is shown in Figures 3 and 4, valve 68 is positively opened by a cam 78 whereby pressure fluid may flow from port 64 past valve 68 through outlet 66 and conduit 28 to cylinder 42. Fluid may also flow at the same time through by-pass 74. During the time that cam 78 remains effective to hold valve 68 open fluid will be supplied rapidly to cylinder 42 effecting fast approach of the tool. As the spindle 38 moves downwardly cam 78 is moved out of contact with push rod 80 and valve 68 will be closed by a relatively high fluid pressure from inlet 64, as shown in Figure 5. With valve 68 closed, fluid is still supplied through by-pass 74 and metering valve 76 whereby the piston 40 is moved downwardly at the desired feed rate. When piston 40 reaches its lowest position switch 98 is actuated to shut-off the high pressure fluid to the cylinder and permit rapid return of the piston under the influence of spring 60, the fluid expelled from the cylinder 42 acting on the undersurface of valve 68 moves the valve toward open position, as shown in Figure 6, whereby the fluid may be returned to the reservoir 10 through port 64 and conduits 22 and 20.

Although a particular embodiment of my invention has been described, it will be understood by those skilled in the art that the objects of the invention may be attained by the use of constructions different in certain respects from that disclosed without departing from the underlying principles of the invention.

I claim:

1. In a machine tool having a source of relatively low fluid pressure and a source of relatively high fluid pressure, a cylinder, a conduit connected to said cylinder, a fluid pressure responsive valve in said conduit, a by-pass connected to said conduit on either side of said valve, a piston in said cylinder movable in one direction under the influence of high pressure fluid, means for connecting said conduit to said high pressure source, means actuated by said piston for positively opening said valve against the force of high pressure fluid acting thereon during a predetermined portion of the piston travel, means actuable by movement of said piston to a predetermined position for connecting said conduit to said lower pressure source, and a spring in said cylinder effective to move said piston in a direction opposite to said one direction when said conduit is connected to said lower pressure source, said valve being opened by the fluid expelled from said cylinder when said piston is moved by said spring.

2. In a machine tool having a source of relatively low pressure fluid and a source of relatively high pressure fluid, a cylinder, a conduit connected to said cylinder, a passage connected to said conduit, means for selectively connecting said passage to said low and high pressure sources, a fluid pressure responsive valve in said conduit exposed on opposite sides to the pressure in said conduit and said passage, said valve being urged toward closed position when the pressure in said passage exceeds the pressure in said conduit and being urged toward open position when the pressure in said conduit exceeds the pressure in said passage, a by-pass connecting said passage and conduit, a piston in said cylinder movable in one direction under the influence of high pressure fluid, a plurality of spaced cams operatively connected to said piston for movement therewith, and a rod formed to engage said cams and said valve to move said valve toward open position.

3. In a machine tool having a source of relatively low fluid pressure and a source of relatively high fluid pressure, a housing, an inlet and an outlet in said housing, a constantly opened conduit connecting said inlet and said outlet, a cylinder, a conduit connecting said cylinder to said outlet, means for selectively connecting said inlet to said low and high pressure sources, a passage connecting said inlet and said outlet, a fluid pressure responsive valve in said passage exposed on opposite sides to the pressures in said inlet and outlet, said valve being urged toward closed position when inlet pressure exceeds outlet pressure and being urged toward open position when outlet pressure exceeds inlet pressure, a piston in said cylinder movable in one direction under the influence of high pressure fluid, and rod means actuated by said piston to open said valve.

References Cited in the file of this patent

UNITED STATES PATENTS

| | | |
|---|---|---|
| 840,877 | Steedman | Jan. 8, 1907 |
| 1,861,742 | Hand | Jan. 7, 1932 |
| 1,877,102 | Whitesell | Sept. 13, 1932 |
| 2,160,920 | Strawn | June 6, 1939 |
| 2,633,709 | Dales | Apr. 7, 1953 |

FOREIGN PATENTS

| | | |
|---|---|---|
| 24,252 | Great Britain | Dec. 18, 1914 |